(12) United States Patent
Chen et al.

(10) Patent No.: US 11,756,462 B2
(45) Date of Patent: *Sep. 12, 2023

(54) DISPLAY DRIVING DEVICE AND OPERATION METHOD THEREOF FOR IMPROVING DISPLAY QUALITY OF 3D IMAGES

(71) Applicant: Acer Incorporated, New Taipei (TW)

(72) Inventors: Jui-Lin Chen, New Taipei (TW); Chao-Shih Huang, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 17/684,433

(22) Filed: Mar. 2, 2022

(65) Prior Publication Data

US 2022/0208037 A1 Jun. 30, 2022

Related U.S. Application Data

(63) Continuation of application No. 17/202,351, filed on Mar. 16, 2021, now Pat. No. 11,308,830.

(30) Foreign Application Priority Data

Dec. 25, 2020 (TW) .................................. 109146148

(51) Int. Cl.
*G09G 3/00* (2006.01)
*G02B 30/27* (2020.01)
*G02B 3/00* (2006.01)
*H04N 13/305* (2018.01)

(52) U.S. Cl.
CPC ............. *G09G 3/001* (2013.01); *G02B 3/005* (2013.01); *G02B 30/27* (2020.01); *H04N 13/305* (2018.05); *G09G 2310/08* (2013.01)

(58) Field of Classification Search
CPC .. G09G 3/001; G09G 2310/08; H04N 13/305; G02B 30/27; G02B 3/00
See application file for complete search history.

(56) References Cited

U.S. PATENT DOCUMENTS

2007/0164950 A1* 7/2007 Tajiri ................... G09G 3/3406
348/E13.059
2011/0142351 A1* 6/2011 Chen ....................... G06T 5/004
382/199

(Continued)

*Primary Examiner* — Roy P Rabindranath
(74) *Attorney, Agent, or Firm* — JCIPRNET

(57) ABSTRACT

The disclosure provides a display driving device and an operation method thereof. The display driving device includes a timing controller circuit and a driving circuit. The timing controller circuit performs oblique filter processing on an original image frame by an oblique filter with an oblique filter mask matrix to generate a processed image frame. The oblique filter comprises an oblique high-pass filter or a smoothing filter. Original pixel data of a current pixel in the original image frame is replaced with new pixel data when the oblique filter mask matrix is configured for the current pixel. The driving circuit drives a display panel module according to the processed image frame. The display panel module includes a tilt lenticular lens layer having a first tilt angle. A second tilt angle of the oblique filter mask matrix of the oblique filter processing corresponds to the first tilt angle.

16 Claims, 3 Drawing Sheets

(56) References Cited

U.S. PATENT DOCUMENTS

2012/0274628 A1* 11/2012 Lim ................... H04N 13/356
 345/419
2012/0327074 A1* 12/2012 Lee ................... H04N 13/359
 345/419

* cited by examiner

Perform oblique filter processing on an original image frame to generate a processed image frame (the tilt angle of the filter mask of the oblique filter processing corresponds to the tilt angle of the tilt lenticular lens layer of the display panel module) —S410

Drive the display panel module according to the processed image frame —S420

DISPLAY DRIVING DEVICE AND OPERATION METHOD THEREOF FOR IMPROVING DISPLAY QUALITY OF 3D IMAGES

CROSS-REFERENCE TO RELATED APPLICATION

This application is a continuation application of and claims the priority benefit of patent application Ser. No. 17/202,351, filed on Mar. 16, 2021, now allowed. The prior patent application Ser. No. 17/202,351 also claims the priority benefit of Taiwan application serial no. 109146148, filed on Dec. 25, 2020. The entirety of each of the above-mentioned patent applications is hereby incorporated by reference herein and made a part of this specification.

BACKGROUND

Technical Field

The disclosure relates to a three-dimensional (3D) image display device, and in particular to a 3D image display driving device and an operation method thereof.

Description of Related Art

Current 3D display technologies include parallax barriers, lenticular lens, and directional backlight. In the lenticular lens 3D imaging technology, a straight (cylindrical) convex lens film (lenticular lens layer) is set on a display panel so that a parallax effect is created through a lens refraction angle. A backlight of a general display panel is arranged horizontally (stripe pixels), and such a backlight arrangement along with a lenticular lens often presents a 3D image with a moiré pattern generated therein. The moiré pattern is formed by high frequency interference irregular fringes.

SUMMARY

The disclosure provides a display driving device and an operation method thereof to improve the display quality of a three-dimensional (3D) image.

In an embodiment of the disclosure, the display driving device as described above includes a timing controller circuit and a driving circuit. The timing controller circuit is configured to perform oblique filter processing on an original image frame by an oblique filter with an oblique filter mask matrix to generate a processed image frame. Wherein, the oblique filter comprises an oblique high-pass filter or a smoothing filter, and original pixel data of a current pixel in the original image frame is replaced with new pixel data when the oblique filter mask matrix is configured for the current pixel. The driving circuit is coupled to the timing controller circuit to receive the processed image frame. The driving circuit is configured to drive a display panel module according to the processed image frame. The display panel module includes a tilt lenticular lens layer having a first tilt angle, and a second tilt angle of the oblique filter mask matrix of the oblique filter processing corresponds to the first tilt angle.

In an embodiment of the disclosure, the operation method as described above includes the following. Oblique filter processing is performed on an original image frame by an oblique filter with an oblique filter mask matrix to generate a processed image frame; and a display panel module is driven according to the processed image frame. Wherein, the oblique filter comprises an oblique high-pass filter or a smoothing filter, and original pixel data of a current pixel in the original image frame is replaced with new pixel data when the oblique filter mask matrix is configured for the current pixel. The display panel module includes a tilt lenticular lens layer having a first tilt angle, and a second tilt angle of the oblique filter mask matrix of the oblique filter processing corresponds to the first tilt angle.

Based on the above, in realizing the display driving device and the operation method thereof described in the embodiments of the disclosure, the oblique filter mask matrix having the tilt angle is configured to perform the oblique filter processing on the original image frame to improve the display quality of a 3D image.

To further describe the features of the disclosure, embodiments accompanied with drawings are described below in details.

DESCRIPTION OF THE EMBODIMENTS

Figure 1:
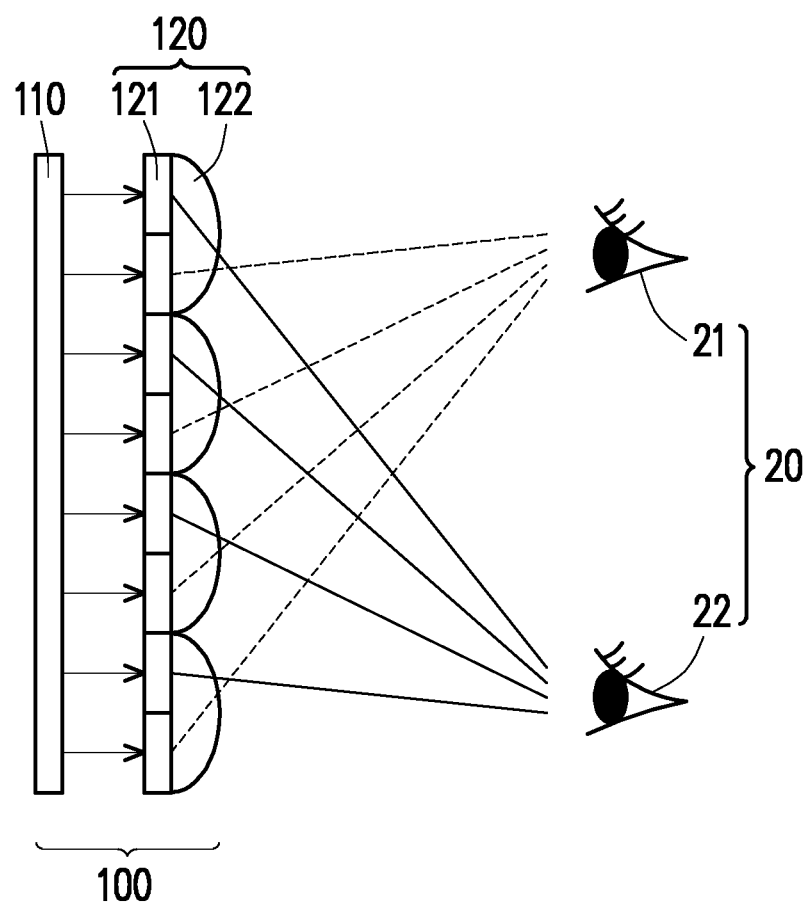
FIG. 1 is a schematic top view of an application scenario of a three-dimensional (3D) image display apparatus according to an embodiment.

The term "coupled" (or "connected") used in the full text of the specification of this application (including the claims) may refer to any direct or indirect connection methods. For example, if the text describes that a first device is coupled (or connected) to a second device, it should be interpreted as that the first device may be directly connected to the second device, or the first device may be indirectly connected to the second device through other devices or connection methods. The terms "first" and "second" mentioned in the full text of the specification of this application (including the claims) are used to name the elements, or to distinguish between different embodiments or ranges, and are not intended to be used to set an upper or lower limit to the number of the elements, or to limit the order of the elements. In addition, wherever possible, elements/components/steps with the same reference numeral in the drawings and embodiments represent the same or similar parts. Descriptions of an element/component/step may be found in related descriptions of elements/components/steps that use the same reference numeral or the same term in other embodiments.

FIG. 1 is a schematic top view of an application scenario of a three-dimensional (3D) image display apparatus 100 according to an embodiment. The 3D image display apparatus 100 may display a 3D image for a viewer 20 to watch. The 3D image display apparatus 100 includes a backlight 110 and a display panel module 120. A 3D imaging technology of the display panel module 120 is to dispose a straight (cylindrical) lenticular lens layer 122 on a display panel 121. Based on a parallax effect created through a lens refraction angle, an image seen by a right eye 21 of the viewer 20 may be different from an image seen by a left eye 22 of the viewer 20. The backlight 110 of the display panel 121 is arranged horizontally (stripe pixels), and such a backlight arrangement along with a lenticular lens might present a 3D image with a moiré pattern generated therein. The moiré pattern is formed by high frequency interference irregular fringes. In order to reduce the moiré patterns, the display panel module 120 may adopt a tilt lenticular lens.

Figure 2:
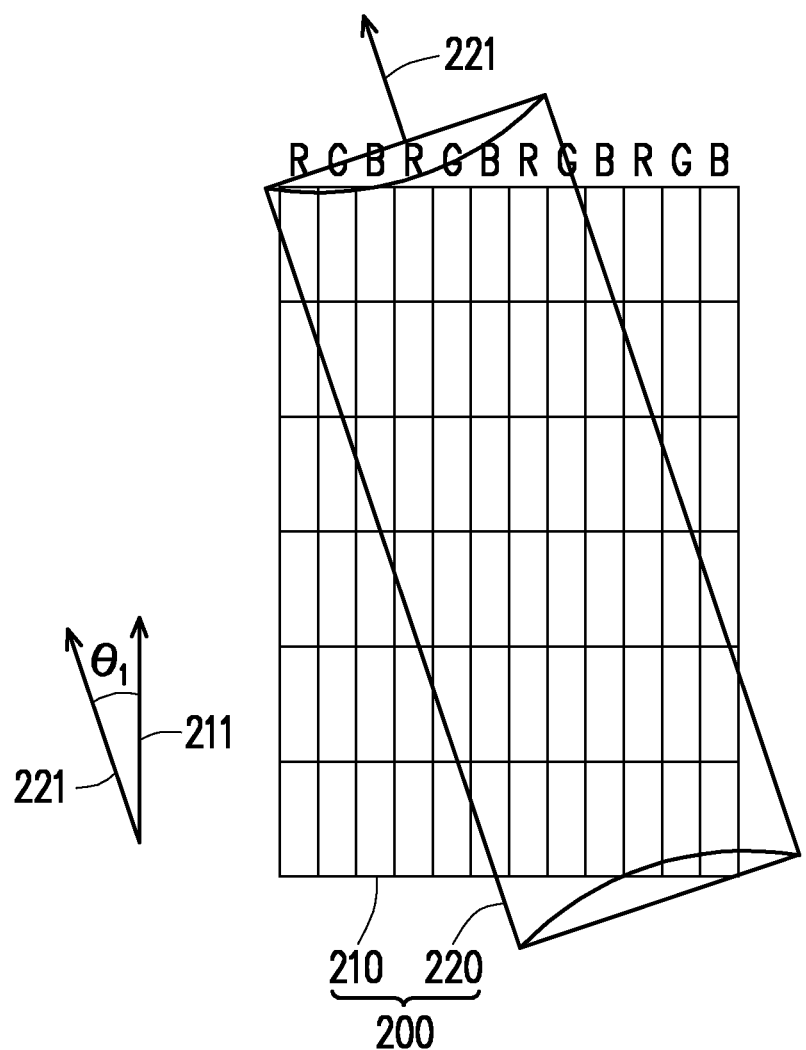
FIG. 2 is a partial zoomed-in schematic view of a tilt lenticular lens layer according to an embodiment.

FIG. 2 is a partial zoomed-in schematic view of a tilt lenticular lens layer 220 according to an embodiment. A display panel module 200 shown in FIG. 2 includes a display panel 210 and a tilt lenticular lens layer 220. Each small square of the display panel 210 shown in FIG. 2 represents a sub-pixel, and "R," "G," and "B" shown in FIG. 2 respectively represent red sub-pixels, green sub-pixels and blue sub-pixels. Descriptions of the display panel module 200, the display panel 210, and the tilt lenticular lens layer 220 shown in FIG. 2 may be found in the related descriptions of the display panel module 120, the display panel 121, and the lenticular lens layer 122 shown in FIG. 1, and (or) descriptions of the display panel module 120, the display panel 121, and the lenticular lens layer 122 shown in FIG. 1 may be found in the related descriptions of the display panel module 200, the display panel 210, and the tilt lenticular lens layer 220 shown in FIG. 2.

In the embodiment shown in FIG. 2, the tilt lenticular lens layer 220 has a first tilt angle $\theta_1$. As shown in FIG. 2, the first tilt angle $\theta_1$ is a tilt angle of the tilt lenticular lens layer 220 in an axis of cylinder direction 221, that is, the angle between the axis of cylinder direction 221 and a column direction 211 of the display panel 210. According to the actual design, the first tilt angle $\theta_1$ may be 17° or other angles. The first tilt angle $\theta_1$ is greater than 0° and less than 90°. It should be noted that in the embodiment shown in FIG. 2, the axis of cylinder direction 221 of the tilt lenticular lens layer 220 is tilted to the left. However, in other embodiments, the axis of cylinder direction 221 of the tilt lenticular lens layer 220 may be tilted to the right.

The tilt lenticular lens layer 220 may reduce (or eliminate) the moiré pattern as described above. However, in some applications, the tilt lenticular lens layer 220 might generate crosstalk, mainly because multiple sub-pixels that are pieced together into one pixel do not have a complete area due to a tilt imaging method. It is particularly so at an edge between a white object and a black object, where an afterimage formed by inconsistent brightness of the edge is visually perceived by the human eye. In order to address the crosstalk issue caused by the tilt lenticular lens layer 220, the following embodiments will illustrate an image processing method.

Figures 3, 4:
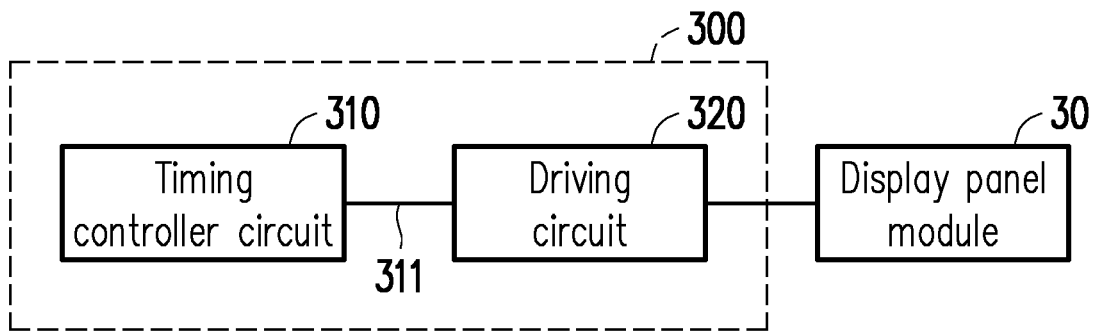
FIG. 3 is a schematic diagram of a circuit block of a display driving device according to an embodiment of the disclosure.
FIG. 4 is a schematic flowchart of an operation method of a display driving device according to an embodiment of the disclosure.

FIG. 3 is a schematic diagram of a circuit block of a display driving device 300 according to an embodiment of the disclosure. The display driving device 300 may drive a display panel module 30 to display a 3D image. Descriptions of the display panel module 30 shown in FIG. 3 may be found in the related descriptions of the display panel module 120 shown in FIG. 1 and/or the related descriptions of the display panel module 200 shown in FIG. 2, so they will not be repeated herein. The display panel module 30 shown in FIG. 3 has a tilt lenticular lens layer (for example, the tilt lenticular lens layer 220 shown in FIG. 2), and the tilt lenticular lens layer has a first tilt angle (for example, the first tilt angle $\theta_1$ shown in FIG. 2).

FIG. 4 is a schematic flowchart of an operation method of a display driving device according to an embodiment of the disclosure. Referring to FIGS. 3 and 4, the display driving device 300 shown in FIG. 3 includes a timing controller circuit 310 and a driving circuit 320. In step S410, the timing controller circuit 310 may configure a filter mask matrix having a second tilt angle $\theta_2$ to perform an oblique filter processing on an original image frame to generate a processed image frame 311 to be provided to the driving circuit 320. The second tilt angle $\theta_2$ of the filter mask matrix of the oblique filter processing corresponds to the first tilt angle $\theta_1$ of the display panel module 30. For example, the second tilt angle $\theta_2$ is the same as the first tilt angle $\theta_1$, but the disclosure is not limited thereto. The driving circuit 320 is coupled to the timing controller circuit 310 to receive the processed image frame 311. In step S420, the driving circuit 320 may drive the display panel module 30 according to the processed image frame 311 to display the 3D image.

An oblique filter may be configured in the oblique filter processing performed in step S410. For example, an oblique high-pass filter, a smoothing filter, or other filters may be configured in the oblique filter processing. A filter mask matrix of general filter processing may be presented as the following matrix 1. It should be noted that although matrix 1 is a 3*3 matrix, the size of the filter mask matrix may be determined according to the actual design.

$$\begin{bmatrix} W11_{(x_0-1,y_0-1)} & W21_{(x_0,y_0-1)} & W31_{(x_0+1,y_0-1)} \\ W12_{(x_0-1,y_0)} & W22_{(x_0,y_0)} & W32_{(x_0+1,y_0)} \\ W13_{(x_0-1,y_0+1)} & W23_{(x_0,y_0+1)} & W33_{(x_0+1,y_0+1)} \end{bmatrix} \quad \text{Matrix 1}$$

In matrix 1, the W11, W12, W13, W21, W22, W23, W31, W32, and W33 represent different elements (weight values) in the filter mask matrix. $x_0$ represents an x component of coordinates of a current pixel in the original image frame, $y_0$ represents a y component of the coordinates of the current pixel. The elements W11 to W33 may be determined according to actual design. In an application example of a high-pass filter, the elements W1, W13, W31 and W33 may be 0, the elements W12, W21, W32 and W23 may be –b, and the element W22 may be a, and a and b may be any real numbers.

Suppose that the original image frame includes pixels $P[x_0-1, y_0-1]$, $P[x_0, y_0-1]$, $P[x_0+1, y_0-1]$, $P[x_0-1, y_0]$, $P[x_0, y_0]$, $P[x_0+1, y_0]$, $P[x_0-1, y_0+1]$, $P[x_0, y_0+1]$, and $P[x_0+1, y_0+1]$, and that $P[x_0, y_0]$ is the current pixel, when the filter mask matrix shown in matrix 1 is configured for the current pixel $P[x_0, y_0]$, original pixel data of the current pixel $P[x_0, y_0]$ is replaced with new pixel data, that is, $W11*P[x_0-1, y_0-1]+W12*P[x_0, y_0-1]+W13*P[x_0+1, y_0-1]+W21*P[x_0-1, y_0]+W22*P[x_0, y_0]+W23*P[x_0+1, y_0]+W31*P[x_0-1, y_0+1]+W32*P[x_0, y_0+1]+W33*P[x_0+1, y_0+1]$.

The filter mask matrix shown in matrix 1 is not an oblique filter mask matrix. To address the crosstalk issue caused by the tilt lenticular lens layer 220, the filter mask matrix shown in matrix 1 needs to be tilted (rotated) the second tilt angle $\theta_2$. According to the actual design, the second tilt angle $\theta_2$ may be 170 or other angles. To tilt (rotate) the mask filter shown in matrix 1 the second tilt angle $\theta_2$, a rotation matrix $M(\theta_2)$ needs to be multiplied by coordinates of a pixel in the original image frame corresponding to each element of matrix 1. Taking the tilt lenticular lens layer 220 shown in FIG. 2 as an example, since the axis of cylinder direction 221 of the tilt lenticular lens layer 220 is tilted to the left, the rotation matrix $M(\theta_2)$ may be the following matrix 2. If the axis of cylinder direction 221 of the tilt lenticular lens layer 220 is tilted to the right, the rotation matrix $M(\theta_2)$ may be the following matrix 3. Suppose that a certain element (for example, $W11[x_0-1, y_0-1]$) in the filter mask matrix corresponds to coordinates of a pixel in the original image frame, $[x_1, y_1]$, that is, $x_1$ is $x_0-1$ and $y_1$ is $y_0-1$, the original coordinates $[x_1, y_1]$ are tilted (rotated) to the left the second tilt angle $\theta_2$ to obtain new coordinates $[\cos(\theta_2)*x_1-\sin(\theta_2)*y_1, \sin(\theta_2)*x_1+\cos(\theta_2)*y_1]$.

$$M(\theta_2) = \begin{bmatrix} \cos\theta_2 & -\sin\theta_2 \\ \sin\theta_2 & \cos\theta_2 \end{bmatrix} \quad \text{Matrix 2}$$

$$M(\theta_2) = \begin{bmatrix} \cos\theta_2 & \sin\theta_2 \\ -\sin\theta_2 & \cos\theta_2 \end{bmatrix} \quad \text{Matrix 3}$$

Suppose that coordinates of a current pixel in the original image frame are $[x_0, y_0]$, and the coordinates of an adjacent pixel of the current pixel $P[x_0, y_0]$ in the original image frame are $[x_0+s, y_0+t]$, and s is an integer in a range from −a to a, t is an integer in a range from −b to b, a is the radius of the filter mask matrix in the X-axis direction, and b is the radius of the filter mask matrix in the Y-axis direction. That is, the filter mask matrix is a matrix of $(2*a+1)*(2*b+1)$, and the radius a and the radius b may be determined according to actual design. The timing controller circuit 310 may multiply the rotation matrix $M(\theta_2)$ (for example, matrix 2 or matrix 3) by the coordinates $[x_0+s, y_0+t]$ to obtain new coordinates, and the timing controller circuit 310 may set the new coordinates as coordinates of a pixel in the original image frame corresponding to an element in the filter mask matrix. Suppose that a certain element in the filter mask matrix (for example, $W11[x_0-1, y_0-1]$) corresponds to coordinates of a pixel in the original image frame, $[x_1, y_1]$, that is, $x_1$ is $x_0-1$ and $y_1$ is $y_0-1$, the rotation matrix $M(\theta_2)$ shown in matrix 2 is multiplied by the original coordinates $[x_1, y_1]$ to obtain new coordinates $[\cos(\theta_2)*x_1-\sin(\theta_2)*y_1, \sin(\theta_2)*x_1+\cos(\theta_2)*y_1]$.

According to the above, by multiplying the rotation matrix $M(\theta_2)$ (for example, matrix 2 or matrix 3) by the pixel coordinates corresponding to each element of a non-oblique filter mask matrix (for example, matrix 1), the non-oblique filter mask matrix may be tilted (rotated) the second tilt angle $\theta_2$ to obtain the oblique filter mask matrix. The pixel coordinates corresponding to the element in such an oblique filter mask matrix are $[\cos(\theta_2)*x_1-\sin(\theta_2)*y_1, \sin(\theta_2)*x_1+\cos(\theta_2)*y_1]$, and $x_1$ is $x_0+s$, $y_1$ is $y_0+t$, $x_0$ is the x component of the coordinates of the current pixel in the original image frame, $y_0$ is the y component of the coordinates of the current pixel, s is an integer in the range from −a to a, t is an integer in the range of −b to b, a is the radius of the oblique filter mask matrix in the X-axis direction, and s is the radius of the oblique filter mask matrix in the Y-axis direction.

In summary, the timing controller circuit 310 described in the foregoing embodiments may use a filter mask matrix having a tilt angle to perform oblique filter processing on the original image frame to reduce the crosstalk caused by the tilt lenticular lens layer 220 as much as possible, thereby improving the display quality of the 3D image.

According to different design needs, the timing controller circuit 310 may be implemented in the form of hardware, firmware, software (program), or a combination of more than one of the above three. In terms of hardware, the timing controller circuit 310 may be implemented as a logic circuit on an integrated circuit. Related functions of the timing controller circuit 310 may be implemented as hardware by using hardware description languages (for example, Verilog HDL or VHDL) or other suitable programming languages. For example, the related functions of the timing controller circuit 310 may be implemented in one or more controllers, microcontrollers, microprocessors, application-specific integrated circuits (ASICs), digital signal processors (DSPs), field programmable gate array (FPGA), and/or various logic blocks, modules, and circuits in other processing units.

In terms of software and/or firmware, the related functions of the timing controller circuit 310 may be implemented as programming codes. For example, general programming languages (for example, C, C++, or an assembly language) or other suitable programming languages may be configured to implement the timing controller circuit 310. The programming codes may be recorded/stored in a recording medium, for example, a read only memory (ROM), a storage device, and/or other non-transitory computer readable media. The storage device includes a hard disk drive (HDD), a solid-state drive (SSD), or other storage devices. A central processing unit (CPU), a controller, a microcontroller, or a microprocessor may read and execute the programming codes from the recording medium, thereby realizing the related functions of the timing controller circuit 310.

Although the disclosure has been disclosed in the above by way of embodiments, the embodiments are not intended to limit the disclosure. Those with ordinary knowledge in the technical field can make various changes and modifications without departing from the spirit and scope of the disclosure. Therefore, the scope of protection of the disclosure is defined by the scope of the appended claims.

What is claimed is:

1. A display driving device, comprising:
   a timing controller circuit, configured to perform oblique filter processing on an original image frame by an oblique filter with an oblique filter mask matrix to generate a processed image frame, wherein the oblique filter comprises an oblique high-pass filter or a smoothing filter, and original pixel data of a current pixel in the original image frame is replaced with new pixel data when the oblique filter mask matrix is configured for the current pixel; and
   a driving circuit, coupled to the timing controller circuit to receive the processed image frame, configured to drive a display panel module according to the processed image frame,
   wherein the display panel module comprises a tilt lenticular lens layer having a first tilt angle, and a second tilt angle of the oblique filter mask matrix of the oblique filter processing corresponds to the first tilt angle, wherein coordinates of a pixel in the original image frame corresponding to an element in the oblique filter mask matrix are $[\cos(\theta_2)*x_1-\sin(\theta_2)*y_1, \sin(\theta_2)*x_1+\cos(\theta_2)*y_1]$, wherein $\theta_2$ is the second tilt angle, $x_1$ is $x_0+s$, $y_1$ is $y_0+t$, $x_0$ is an x component of coordinates of the current pixel in the original image frame, $y_0$ is a y component of the coordinates of the current pixel, s is an integer in a range of −a to a, t is an integer in a range of −b to b, a is a radius of the oblique filter mask matrix in an X-axis direction, and s is a radius of the oblique filter mask matrix in a Y-axis direction.

2. The display driving device according to claim 1, wherein the second tilt angle is the same as the first tilt angle.

3. The display driving device according to claim 1, wherein the first tilt angle is a tilt angle of the tilt lenticular lens layer in an axis of cylinder direction.

4. The display driving device according to claim 1, wherein the second tilt angle is greater than 0° and less than 90°, and the first tilt angle is greater than 0° and less than 90°.

5. A display driving device, comprising:
a timing controller circuit, configured to perform oblique filter processing on an original image frame by an oblique filter with an oblique filter mask matrix to generate a processed image frame, wherein the oblique filter comprises an oblique high-pass filter or a smoothing filter, and original pixel data of a current pixel in the original image frame is replaced with new pixel data when the oblique filter mask matrix is configured for the current pixel; and
a driving circuit, coupled to the timing controller circuit to receive the processed image frame, configured to drive a display panel module according to the processed image frame,
wherein the display panel module comprises a tilt lenticular lens layer having a first tilt angle, and a second tilt angle of the oblique filter mask matrix of the oblique filter processing corresponds to the first tilt angle, wherein coordinates of a current pixel in the original image frame are $[x_0, y_0]$, and coordinates of an adjacent pixel of the current pixel in the original image frame are $[x_0+s, y_0+t]$, wherein s is an integer in a range of $-a$ to a, t is an integer in a range of $-b$ to b, a is a radius of the oblique filter mask matrix in an X-axis direction, b is a radius of the oblique filter mask matrix in a Y-axis direction, wherein the timing controller circuit multiplies a rotation matrix by the coordinates $[x_0+s, y_0+t]$ to obtain new coordinates, and the timing controller circuit sets the new coordinates as coordinates of a pixel in the original image frame corresponding to an element in the oblique filter mask matrix.

6. The display driving device according to claim 5, wherein the rotation matrix is $$M(\theta_2) = \begin{bmatrix} \cos\theta_2 & -\sin\theta_2 \\ \sin\theta_2 & \cos\theta_2 \end{bmatrix}.$$

7. The display driving device according to claim 5, wherein the rotation matrix is $$M(\theta_2) = \begin{bmatrix} \cos\theta_2 & \sin\theta_2 \\ -\sin\theta_2 & \cos\theta_2 \end{bmatrix}.$$

8. The display driving device according to claim 5, wherein by multiplying a rotation matrix by a pixel coordinate corresponding to each element of a non-oblique filter mask matrix, the timing controller circuit rotates the non-oblique filter mask matrix by the second tilt angle to obtain the oblique filter mask matrix.

9. An operation method of a display driving device, comprising:
performing oblique filter processing on an original image frame by an oblique filter with an oblique filter mask matrix to generate a processed image frame, wherein the oblique filter comprises an oblique high-pass filter or a smoothing filter, and original pixel data of a current pixel in the original image frame is replaced with new pixel data when the oblique filter mask matrix is configured for the current pixel; and
driving a display panel module according to the processed image frame,
wherein the display panel module comprises a tilt lenticular lens layer having a first tilt angle, and a second tilt angle of the oblique filter mask matrix of the oblique filter processing corresponds to the first tilt angle, wherein coordinates of a pixel in the original image frame corresponding to an element in the oblique filter mask matrix are $[\cos(\theta_2)*x_1-\sin(\theta_2)*y_1, \sin(\theta_2)*x_1+\cos(\theta_2)*y_1]$, wherein $\theta_2$ is the second tilt angle, $x_1$ is $x_0+s$, $y_1$ is $y_0+t$, $x_0$ is an x component of coordinates of the current pixel in the original image frame, $y_0$ is a y component of the coordinates of the current pixel, s is an integer in a range of $-a$ to a, t is an integer in a range of $-b$ to b, a is a radius of the oblique filter mask matrix in an X-axis direction, and b is a radius of the oblique filter mask matrix in a Y-axis direction.

10. The operation method according to claim 9, wherein the second tilt angle is the same as the first tilt angle.

11. The operation method according to claim 9, wherein the first tilt angle is a tilt angle of the tilt lenticular lens layer in an axis of cylinder direction.

12. The operation method according to claim 9, wherein the second tilt angle is greater than 0° and less than 90°, and the first tilt angle is greater than 0° and less than 90°.

13. An operation method of a display driving device, comprising:
performing oblique filter processing on an original image frame by an oblique filter with an oblique filter mask matrix to generate a processed image frame, wherein the oblique filter comprises an oblique high-pass filter or a smoothing filter, and original pixel data of a current pixel in the original image frame is replaced with new pixel data when the oblique filter mask matrix is configured for the current pixel; and
driving a display panel module according to the processed image frame,
wherein the display panel module comprises a tilt lenticular lens layer having a first tilt angle, and a second tilt angle of the oblique filter mask matrix of the oblique filter processing corresponds to the first tilt angle, wherein coordinates of a current pixel in the original image frame are $[x_0, y_0]$, and coordinates of an adjacent pixel of the current pixel in the original image frame are $[x_0+s, y_0+t]$, wherein s is an integer in a range of $-a$ to a, t is an integer in a range of $-b$ to b, a is a radius of the oblique filter mask matrix in an X-axis direction, s is a radius of the oblique filter mask matrix in a Y-axis directions;
multiplying a rotation matrix by the coordinates $[x_0+s, y_0+t]$ to obtain new coordinates; and
setting the new coordinates as coordinates of a pixel in the original image frame corresponding to an element in the oblique filter mask matrix.

14. The operation method according to claim 13, wherein the rotation matrix is $$M(\theta_2) = \begin{bmatrix} \cos\theta_2 & -\sin\theta_2 \\ \sin\theta_2 & \cos\theta_2 \end{bmatrix}.$$

15. The operation method according to claim 13, wherein the rotation matrix is $$M(\theta_2) = \begin{bmatrix} \cos\theta_2 & \sin\theta_2 \\ -\sin\theta_2 & \cos\theta_2 \end{bmatrix}.$$

16. The operation method according to claim 9, further comprising:

multiplying a rotation matrix by a pixel coordinate corresponding to each element of a non-oblique filter mask matrix, so as to rotate the non-oblique filter mask matrix by the second tilt angle to obtain the oblique filter mask matrix.

* * * * *